US012159764B2

(12) United States Patent
Lu et al.

(10) Patent No.: US 12,159,764 B2
(45) Date of Patent: Dec. 3, 2024

(54) PLUG-IN CIRCUIT BREAKER

(71) Applicant: ZHEJIANG CHINT & ELECTRICS CO., LTD., Zhejiang (CN)

(72) Inventors: Kejun Lu, Zhejiang (CN); Xiangyi Gu, Zhejiang (CN); An Yang, Zhejiang (CN); Jun Zhu, Zhejiang (CN); Shaojun Guo, Zhejiang (CN)

(73) Assignee: ZHEJIANG CHINT & ELECTRICS CO., LTD. (CN)

( * ) Notice: Subject to any disclaimer, the term of this patent is extended or adjusted under 35 U.S.C. 154(b) by 210 days.

(21) Appl. No.: 17/776,289

(22) PCT Filed: Nov. 14, 2020

(86) PCT No.: PCT/CN2020/128877
§ 371 (c)(1),
(2) Date: May 12, 2022

(87) PCT Pub. No.: WO2021/093878
PCT Pub. Date: May 20, 2021

(65) Prior Publication Data

US 2023/0012081 A1 Jan. 12, 2023

(30) Foreign Application Priority Data

Nov. 15, 2019 (CN) ........................ 201911122584.9

(51) Int. Cl.
*H01H 71/04* (2006.01)
*H01H 1/36* (2006.01)
(Continued)

(52) U.S. Cl.
CPC .......... *H01H 71/1009* (2013.01); *H01H 1/36* (2013.01); *H01H 71/025* (2013.01); *H01H 71/04* (2013.01); *H01H 71/58* (2013.01)

(58) Field of Classification Search
CPC ...... H01H 71/025; H01H 71/04; H01H 71/58; H01H 71/1009
See application file for complete search history.

(56) References Cited

U.S. PATENT DOCUMENTS 11,164,712 B2 * 11/2021 Pan .................... H01H 71/0264

FOREIGN PATENT DOCUMENTS

CN 207624637 U 7/2018
CN 209487449 U 10/2019
(Continued)

OTHER PUBLICATIONS

International Search Report mailed Feb. 18, 2021 in corresponding PCT International Application No. PCT/CN2020/128877.
(Continued)

*Primary Examiner* — Ramon M Barrera
(74) *Attorney, Agent, or Firm* — OSTROLENK FABER LLP

(57) ABSTRACT

A plug-in circuit breaker that includes a housing, an operating mechanism and a button mechanism which has a closing position and an opening position. The circuit breaker further includes a locking member and a linkage member arranged inside the housing. The linkage member is provided with an abutting protruding stand. The locking member is provided with a locking protruding stand. When the button mechanism is in the closing position, the abutting protruding stand of the linkage member extends out of the housing and is limited by the button mechanism at an extension position, so that it cannot retract into the housing. When the button mechanism is in the opening position, the linkage member retracts into the housing, the locking protruding stand of the locking member extends out of the housing, and the locking protruding stand of the locking member can be pushed back into the housing.

16 Claims, 6 Drawing Sheets

(51) Int. Cl.
*H01H 71/02* (2006.01)
*H01H 71/10* (2006.01)
*H01H 71/58* (2006.01)

(56) References Cited

FOREIGN PATENT DOCUMENTS

| | | | |
|---|---|---|---|
| CN | 209544266 | U | 10/2019 |
| CN | 111477513 | A | 7/2020 |
| CN | 211350528 | U | 8/2020 |
| JP | 2009199898 | A | 9/2009 |

OTHER PUBLICATIONS

Written Opinion mailed Feb. 18, 2021 in corresponding PCT International Application No. PCT/CN2020/128877.

* cited by examiner

PLUG-IN CIRCUIT BREAKER

CROSS-REFERENCE TO RELATED APPLICATIONS

The present application is a 35 U.S.C. §§ 371 national stage application of International Application No. PCT/CN2020/128877, filed Nov. 14, 2020, which claims priority to Chinese Patent Application No. 201911122584.9, filed Nov. 15, 2019, the contents of both of which are incorporated herein by reference.

FIELD OF THE INVENTION

The present invention relates to the field of low-voltage electrical appliances, in particular to a plug-in circuit breaker.

BACKGROUND OF THE INVENTION

With the rapid development of the network communication technology, especially the application and popularization of 5G networks, the circuit breaker is required to effectively improve the safety of electrical equipment more and more highly, but the traditional terminal circuit breaker required to connect a plurality of sockets and plug-in boards in a traditional power supply mode is far less likely to meet the requirements of electric safety and equipment protection. The terminal circuit breakers used in 5G communication equipment not only are expected to improve the performance in miniaturization, intelligence, reliability, stability and the like, but also have developed a lot of new mating structures in use requirements, such as, convenient plug-in and plug-out operations like receptacle plugs, of circuit breakers, which are novel circuit breakers referred to as plug-in circuit breakers, but not the circuit breakers pertaining to any one of a conventional plug-in type, plug-in and plug-out type, drawer-type and universal type. The novel plug-in circuit breakers not only can provide various safety protection performance of a circuit breaker for power lines and electrical equipment, but also can meet the requirements of various electric appliances on power supply quality, enabling circuit breakers to be conveniently connected/disconnected to a circuit in a plug-in and plug-out mode. To this end, the structure of the plug-in circuit breaker has evolved to a wide range, but in the development trend of miniaturizing electrical equipment, it is still necessary to further improve, optimize and upgrade the overall structure and operation mode of the mating circuit breaker.

Existing plug-in circuit breakers are usually provided with a locking apparatus to prevent the circuit breaker from being pulled out in the closing state and/or prevent the circuit breaker from closing in the insertion process, but without a limiting mechanism usually in the opening state, allowing the insertion of circuit breakers into the cabinet, which therefore results in enabling the circuit breaker to fall out of the cabinet during a transportation process or in a situation with vibration and the like.

Moreover, the existing locking apparatus often cannot prevent erroneous reckless plug-in or plug-out operations in the closing state. In addition, the mechanisms of the existing circuit breakers, such as a locking apparatus and a fixed unlocking apparatus, commonly lack the design to avoid easy failure, and poor reliability and stability of the plug-in and plug-out protection function arising from factors, such plug-in receiver structures. Furthermore, the mechanisms of the existing circuit breakers, such as a locking apparatus and a fixed unlocking apparatus result in disadvantageous problems in interchangeability, universality, tolerance and the like, without consideration to the influence of the apparatus structure adopted by the existing plug-in circuit breaker on the match of plug-in receivers.

In addition, the locking apparatus of the existing plug-in circuit breaker has numerous parts, a complex structure and tedious functions, and with certain elasticity of the metal plate structure used for installing a cabinet body, the circuit breaker can be recklessly installed into the cabinet violently in the closing state, so it is risked with energized operations. This is mainly ascribed to the transverse force (component force) of the plug-in and plug-out force applied on the circuit breaker, for example, based on mechanical analysis, we can see that the plug-in and plug-out force applied on the circuit breaker is an active force, which can be disassembled into a longitudinal force parallel to the plug-in and plug-out direction and a transverse force perpendicular to the plug-in and plug-out direction. During plug-in and plug-out operations, the bigger the internal force (such as a frictional force, elastic force, etc., which are opposite to the longitudinal force of the plug-in and plug-out force) of the mechanism resisting the plug-in and plug-out force becomes, the larger plug-in and plug-out force it requires, that is, expending physical strength; otherwise, the smaller plugging force is requires, that is, saving physical strength, so it is easy to perform plug-in and plug-out operations. In the case that the transverse forces (component force) of the plug-in and plug-out force applied on the circuit breaker is large, one portion (or one point) of circuit breakers bears such force, thus leads to stress concentration, which easily causes the deformation of the plug-in receiver directly involving the adaptation performance of circuit breakers. Therefore, mechanisms are designed to minimize (best avoid) the structure with transverse forces (component force), in particular the structure capable of amplifying the transverse forces (such as a tapered wedge, an inclined surface and a lever), but it is never considered in the prior art.

SUMMARY OF THE INVENTION

The present invention aims to provide a plug-in circuit breaker with simple structure and high reliability.

In order to achieve the above object, the present invention adopts the following technical solutions:

A plug-in circuit breaker comprising a housing, an operating mechanism and a button mechanism, the button mechanism actuates the operating mechanism to perform the closing/opening operation, and has a closing position and a opening position corresponding to closing/opening states of the circuit breaker, wherein the circuit breaker further includes a locking member and a linkage member arranged inside the housing, the linkage member is provided with an abutting protruding stand, the locking member is provided with a locking protruding stand; when the button mechanism is in the closing position, the abutting protruding stand of the linkage member extends out of the housing and is limited by the button mechanism at an extension position, so that it cannot retracts into the housing; when the button mechanism is in the opening position, the linkage member retracts into the housing, the locking protruding stand of the locking member extends out of the housing, and the locking protruding stand of the locking member can be pushed back into the housing under the action of an external force for retraction.

Preferably, when the button mechanism is in the opening position, the locking protruding stand of the locking member retracts into the housing under the action of the external force for retraction, thus the locking member abuts and fits with the button mechanism to hinder the button mechanism from switching from the opening position to the closing position.

Preferably, when the button mechanism is in the closing position, the locking protruding stand of the locking member extends out of the housing and is limited by the button mechanism at the extension position, so that it cannot retract into the housing.

Preferably, after the circuit breaker is opened, the button mechanism can be pulled out to move toward the outside of the housing, during such movement, the button mechanism enables the locking protruding stand of the locking member to return into the housing.

Preferably, during the movement of the button mechanism toward the outside of the housing, the button mechanism actuates the linkage member, the linkage member drives the locking member to unlock, so that the locking protruding stand retracts into the housing.

Preferably, the linkage member is rotatably arranged on the housing, and includes an unlocking portion fitting with the locking member and a linkage driving portion fitting with the button mechanism, the button mechanism, during moving toward the outside of the housing, actuates the linkage member to rotate by means of the linkage driving portion, the unlocking portion applies a force on the locking member to retract the locking protruding stand of the locking member into the housing.

Preferably, the button mechanism includes a button, a connecting rod and a driving member, the button activates the driving member to act by means of the connecting rod, the driving member is rotatably arranged inside the housing and connected with the operating mechanism.

Preferably, when the button mechanism is in the closing position, the locking protruding stand of the locking member extends out of the housing, and the outer side surface of the driving member abuts and fits with the locking member, so that the locking member cannot retracts into the housing; when the button mechanism is in the opening position, the outer side surface of the driving member is misaligned with the locking member to release the abutting fit.

Preferably, the locking member further includes an extending post, the driving member further includes a driving limiting portion fitting with the extending post, when the button mechanism is in the opening position, the driving limiting portion of the driving member faces the extending post of the locking member, when the locking protruding stand of the locking member retracts into the housing, the extending post of the locking member is in limit fit with the driving limiting portion to hinder the driving member from rotating in the closing direction, preventing the button mechanism from switching from the opening position to the closing position.

Preferably, the locking member is installed inside the housing by means of an elastic member, the elastic member is installed between the locking member and the housing, the elastic member enables the locking protruding stand of the locking member to extend out of the housing.

Preferably, the cross section of the locking protruding stand of the locking member is a right-angled trapezoid or a right-angled triangle, the locking protruding stand includes a straight surface and an inclined surface, the straight surface faces the direction for the circuit breaker to be pulled out of the cabinet and is perpendicular to the installation-insertion direction of the circuit breaker, the inclined surface faces the direction for the circuit breaker to be inserted into the cabinet.

Preferably, the linkage member includes the abutting protruding stand and an activated protruding stand, during the closing process, the button mechanism enables the abutting protruding stand to extend out of the housing by pushing the activated protruding stand, and the button mechanism abuts against and fits with the activated protruding stand, so that the abutting protruding stand cannot retract into the housing, during the opening process, the button mechanism releases the abutting fit with the activated protruding stand and is displaced, so that the abutting protruding stand retracts into the housing.

Preferably, a limiting hole is arranged on the housing, the abutting protruding stand of the linkage member and the locking protruding stand of the locking member fit with the identical limiting hole.

Preferably, the button mechanism includes a button, a connecting rod, and a driving member, the button actuates the driving member to act by means of the connecting rod, the driving member is rotatably arranged in the housing and connected to the operating mechanism, the button is provided with a first driving portion fitting with the activated protruding stand, when the button mechanism is in the closing position, the button and the activated protruding stand abut against the first driving portion, when the button mechanism is in the opening position, the first driving portion of the button is dislocated and displaced with the activated protruding stand.

Preferably, the abutting protruding stand is a square protruding stand, and includes a left contour surface and a right contour surface, when the abutting protruding stand is in the extension position, the left contour surface and the right contour surface are respectively perpendicular to the installation insertion direction of the circuit breaker, the left contour surface prevents the circuit breaker from being pulled out of the cabinet in the direction the circuit breaker is pulled out of the cabinet, and the right contour surface prevents the circuit breaker from being inserted into the cabinet in the direction the circuit breaker is inserted into the cabinet.

Preferably, a limiting hole fitting with the locking protruding stand is arranged on the housing, the locking member is installed inside the housing by means of a linear sliding pair, the direction of the linear movement thereof is perpendicular to the installation-insertion direction of the circuit breaker, the locking member is arranged between the button mechanism and the limiting hole, the upper portion of the locking member close to the limiting hole is provided with the locking protruding stand, and the lower portion of the locking member close to the button mechanism is provided with an extending post, a linkage step fitting with the linkage member is arranged on one side of the locking protruding.

Preferably, the linkage member has the middle provided with a rotating center, one end provided with the abutting protruding stand at one side and provided with an unlocking portion fitting with the locking member at the other side, and the other end provided with a linkage driving portion, the activated protruding stand is arranged at one side, close to the button mechanism, between the rotating center and the abutting protruding stand, the button mechanism is provided with the driving portion fitting with the linkage driving portion, during the opening process, the button mechanism releases the abutting fit with the activated protruding stand and is displaced while moving toward the outside of the housing, and the driving portion on the button mechanism pulls the linkage driving portion to actuate the linkage member to rotate, so that the abutting protruding stand retracts into the housing; when the button mechanism is in the opening position, the button mechanism can be pulled to move toward the outside of the housing, and the driving portion continues to drive the linkage member to rotate while the button mechanism continues to move toward the outside of the housing, so that the unlocking portion applies an external retracting force on the locking member, thus the locking member returns to the housing.

The plug-in circuit breaker of the present invention includes the circuit breaker housing; the locking member, the linkage member and the button mechanism installed inside the circuit breaker housing; when the button mechanism is in the closing position, the abutting protruding stand of the linkage member is limited to the extension position by the button mechanism and cannot retracts to the retraction position, enabling itself to act as a reliable hindrance to the plug-in and plug-out operations during the circuit breaker closing, and avoid the risk with energized operations. In addition, when the circuit breaker is in the opening state, the abutting protruding stand of the linkage member retracts into the housing, and the locking protruding stand of the locking member extends out of the housing, but can be pushed back into the housing under the action of an external force for retraction, that is, it does not hinder the circuit breaker from being inserted into the cabinet in the opening state, and protects the circuit breaker from falling out of the cabinet with vibration during a transportation process.

In addition, when the button mechanism is in the opening position, the locking protruding stand of the locking member retracts into the housing, thus the locking member hinders the button mechanism from switching from the opening position to the closing position, so as to disenable the circuit breaker to perform the closing operation, thus when the circuit breaker is not installed at the correct operating position of the cabinet it cannot be closed, only when the circuit breaker is installed at the correct position, the button mechanism can normally perform the closing and opening operation.

In addition, when the button mechanism is in the closing position, the locking member is limited in the extension position and cannot retract to the retraction position, and as an auxiliary mechanism together with the linkage member acts as a reliable hindrance to prevent the circuit breaker from being forcibly pulled out under the closing state. This structure characterized by its incapability to retract to the retraction position, effectively enhances the capability of circuit breaker products to resist the non-normal reckless plug-out operation.

In addition, when the button mechanism is in the opening position, if required to remove the circuit breaker, the locking protruding stand of the locking member retracts into the housing by the linkage unlocking member, so that the circuit breaker is safely pulled out from the installed cabinet.

DETAILED DESCRIPTION OF SOME EMBODIMENTS

We further describe the embodiments of the plug-in circuit breaker according to the present invention as follows in combination with the examples shown in FIGS. 1-11. The plug-in circuit breaker of the present invention is not limited to the description of the following embodiments.

Figure 1:
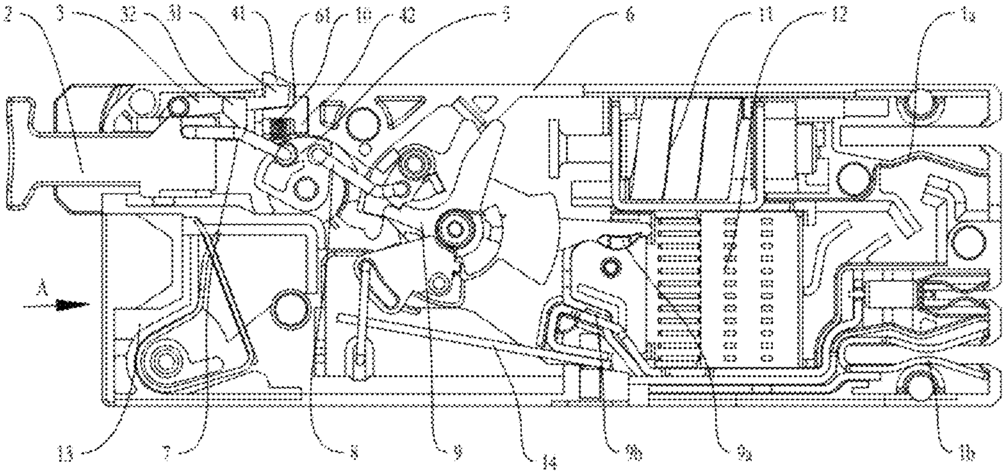
FIG. 1 is an overall structure view of the plug-in circuit breaker of the present invention.

As shown in FIG. 1, the plug-in circuit breaker of the present invention comprises the housing 6, the button mechanism, the operating mechanism 9 drivingly connected with the button mechanism, the movable contact 9*a* connected with the operating mechanism 9, and the stationary contact 9*b* arranged opposite to the movable contact 9*a*, moreover, generally includes, but is not limited to, the short-circuit protection mechanism 11, the arc extinguishing apparatus 12, the overload protection mechanism 14, the wire-outlet connecting apparatus 13, the wire-inlet connecting apparatus 1*a*, 1*b* and other components of circuit breakers (not shown). The button mechanism actuates the operating mechanism 9 to activate the movable contact to in contact with the stationary contact, or actuates the operating mechanism 9 to activate the movable contact to break contact off the stationary contact, and the button mechanism has a closing position and a opening position corresponding to a closing state and a opening state of a circuit breaker.

Figure 2:
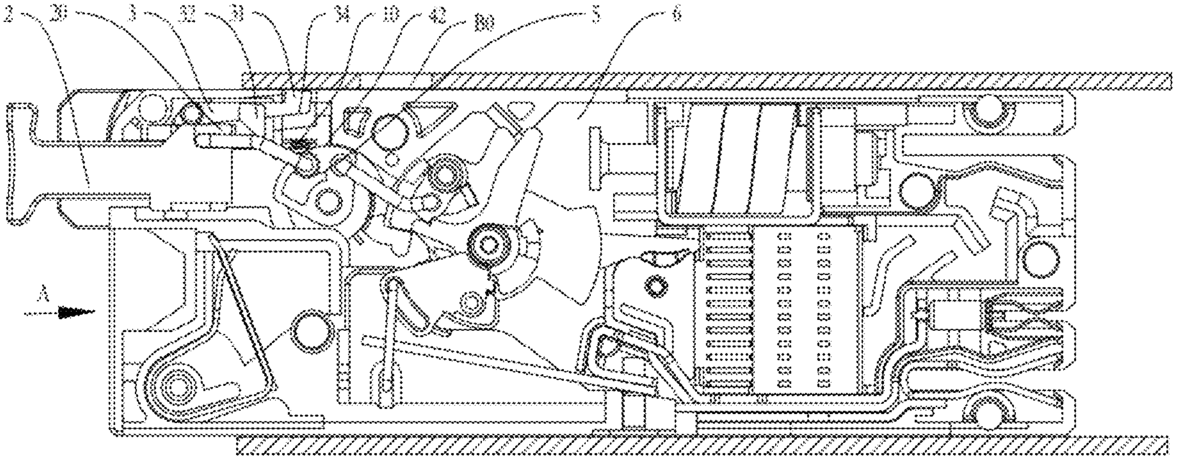
FIG. 2 is a structure view of the button mechanism, the linkage member and the locking member.

As shown in FIGS. 1-2, A locking apparatus is further arranged inside the plug-in circuit breaker, the limiting hole 61 fitting with the locking apparatus is arranged on the housing 6, and the cabinet limiting hole B0 is formed on the sheet metal part of the receiver which the plug-in circuit breaker inserted thereinto. When the plug-in circuit breaker is installed to the operating position, the limiting hole 61 of the plug-in circuit breaker corresponds to the cabinet limiting hole B0, and when the plug-in circuit breaker is not installed to the operating position, the limiting hole 61 of the plug-In circuit breaker is dislocated off the cabinet limiting hole B0, so the cabinet sheet metal part B shields the cabinet limiting hole B0, as it pertains to the prior art in the art, details for it are not described herein again.

Figure 4:
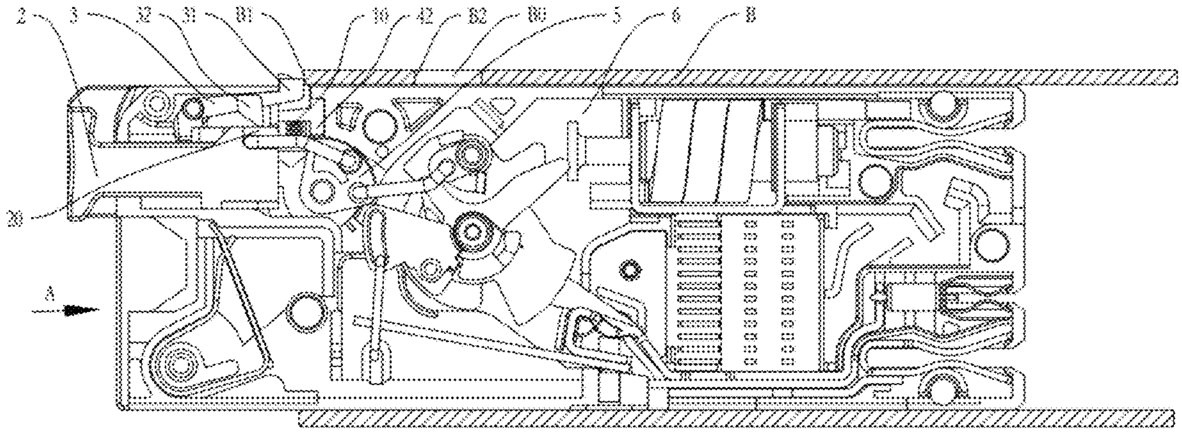
FIG. 4 is a structure view of the circuit breaker in the anti-energized plug-in state during installation.
Figure 5:
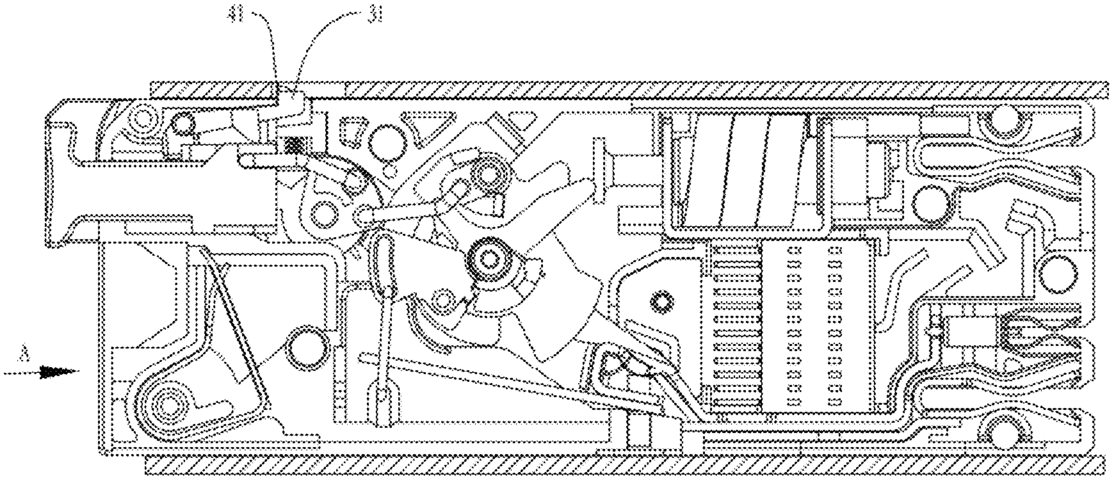
FIG. 5 is a structure view of the plug-in circuit breaker in the anti-closing and plug-out state.

As shown in FIGS. 1 and 4-5, the plug-in circuit breaker of the present invention includes the housing 6 provided with the limiting hole 61, a button mechanism and the operating mechanism 9, wherein the button mechanism actuates the operating mechanism 9 to perform closing and opening operations, and the button mechanism has the closing position and the opening position corresponding to the closing state and the opening state of the circuit breaker. The button mechanism includes the button 2, the connecting rod 7 and the driving member 5, wherein the button 2 activates the driving member 5 to act by means of the connecting rod 7, the driving member 5 is rotatably arranged inside the housing 6 and connected with the operating mechanism 9. Pressing the button 2 actuates the driving member 5 to rotate towards one side by means of the connecting rod 7, and the driving member 5 actuates the operating mechanism 9 to activate the movable contact 9*a* and the stationary contact 9*b* to in contact with each other by means of the U-shaped rod 8. Pulling out the button 2 actuates the driving member 5 to rotate towards the other side by means of the connecting rod 7, and the driving member 5 actuates the operating mechanism 9 to activate the movable contact 9*a* and the stationary contact 9*b* to break contact with each other by means of the U-shaped rod 8. The driving member 5 has a function similar to that of the handles of conventional small circuit breakers, the operating mechanism usually includes a contact support connected with the movable contact 9*a*, a lock catch and a jump buckle, the short-circuit protection mechanism and the overload protection mechanism are arranged correspondingly to the lock catch of the operating mechanism; when a short-circuit fault or an overload fault occurs, acting on the lock catch enables the operating mechanism to trip off, so that the circuit breaker enters the opening state for protection.

The present invention has an improvement in that the circuit breaker further comprises a locking apparatus including the linkage member 3 provided with the abutting protruding stand 31, and the locking member 4 provided with the locking protruding stand 41 corresponding to the limiting hole 61, both arranged inside the housing 6. When the button mechanism is in the closing position, the abutting protruding stand 31 of the linkage member 3 extends out of the housing 6 and is limited by the button mechanism 2 at the extension position, so it cannot retracts into the housing. When the button mechanism is in the opening position, the linkage member 3 retracts into the housing 6, and the locking protruding stand 41 of the locking member 4 extends out of the limiting hole 61 of the housing 6, applying an external force for retraction on the locking member 4, then the locking member 4 can be pushed back into the housing 6 under the action of the external force for retraction. In one embodiment, the abutting protruding stand 31 of the linkage member 3 is arranged correspondingly to the second limiting hole on the housing 6, the second limiting hole and the limiting hole 61 are arranged side by side, when the button mechanism is in the closing position, the abutting protruding stand 31 extends out of the second limiting hole of the housing 6. In another preferred embodiment, the second limiting hole and the limiting hole 61 are an identical limiting hole, and the abutting protruding stand 31 and the locking protruding stand 41 share the identical limiting hole 61. In the present embodiment, it is configured that the abutting protruding stand 31 and the locking protruding 41 share the identical limiting hole 61.

Figure 11:
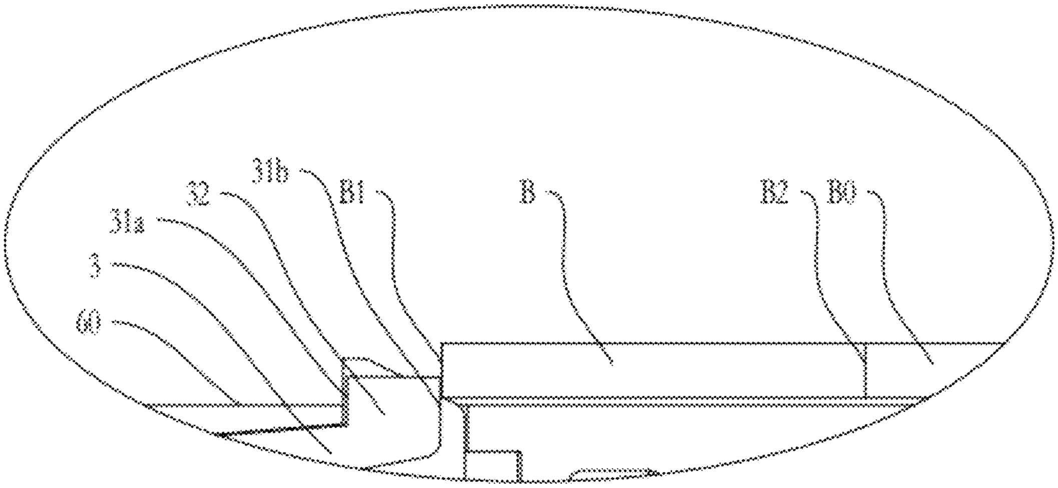
FIG. 11 is a structure view of the specific embodiment of the linkage member and the housing according to the present invention.

As shown in FIGS. 4 and 11, the circuit breaker is closed before installation, thus the first driving portion 20 of the button 2 actuates the linkage member to rotate counterclockwise, the abutting protruding stand 31 of the linkage member 3 extends out of the limiting hole 61 of the housing 6, and the first driving portion 20 of the button 2 abuts against and is limited at the extension position, so it cannot retract into the housing, when the circuit breaker is reinstalled in the cabinet body, the right contour surface 31*b* of the abutting protruding stand 31 abuts against and fits with the transverse end face B1 of the cabinet sheet metal part, the circuit breaker cannot be installed to the operating position, avoiding energized operations, and improving safety.

As shown in FIG. 5, when the circuit breaker is correctly installed and closed, the abutting protruding stand 31 of the linkage member 3 extends out of the limiting hole 61 of the housing 6, and abuts against and is limited at the extension position by the first driving portion 20 of the button 2, so it cannot retract into the housing, when the left contour surface 31*a* of the abutting protruding stand 31 abuts against one hole wall surface b2 of the cabinet limiting hole b0 of the cabinet sheet metal part, if pulled outwards, the circuit breaker cannot be pulled out from the operating position, avoiding energized operations, and improving safety.

Figure 6:
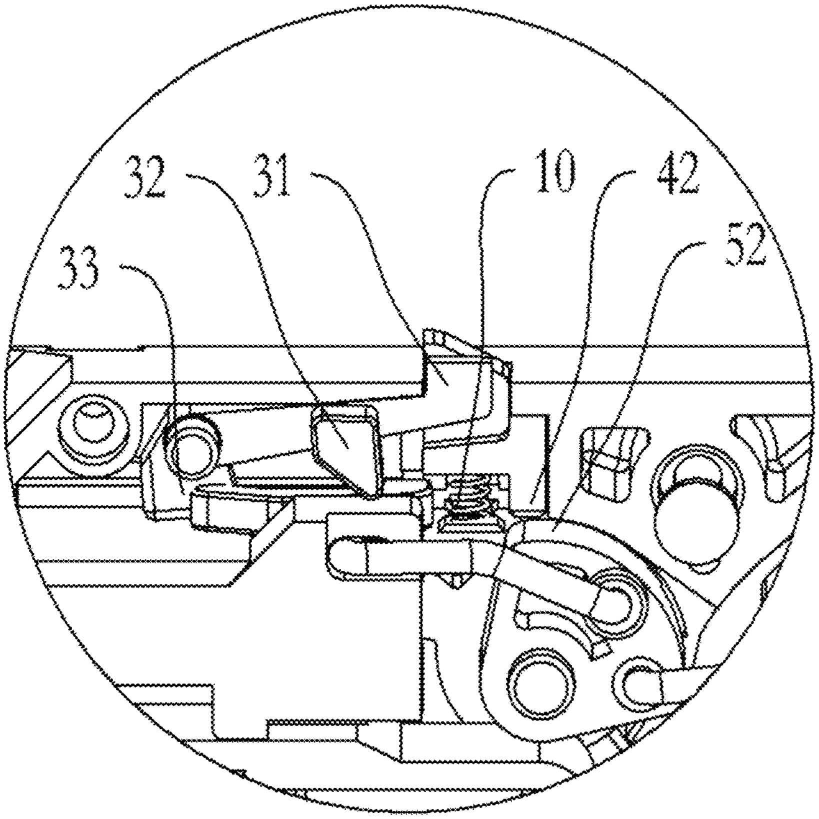
FIG. 6 is a partial enlarged view of the linkage member, the locking member and the handle in the correct installation and closing state.

As shown in FIGS. 1 and 6, the locking member 4 is installed inside the housing 6 by means of an elastic member, the locking member 4 is provided with the locking protruding stand 41 arranged opposite to the limiting hole 61, the elastic member is installed between the locking member 4 and the housing 6. The locking member 4 has two operating positions for retraction and extension, the elastic member enables the locking protruding stand 41 of the locking member 4 to extend out of the limiting hole 61. When the circuit breaker is opened, an external force for retraction is applied on the locking member 4, and then the locking member 4 retracts the locking protruding stand 41 into the housing against a bias force of the elastic member. By enabling the locking protruding stand 41 of the locking member 4 to extend out of the limiting hole in the opening state, the circuit breaker can effectively be prevented from falling out of the cabinet with vibration during a transportation process and the like, and meanwhile, applying an external force for retraction on the locking member 4 enables the locking protruding stand 41 to retract into the housing, so that in the opening state, during insertion of the circuit breaker into the cabinet, the locking protruding stand 41 of the locking member 4 retracts into the housing under the action of the external extrusion force applied by the cabinet sheet metal part, thereby enabling the circuit breaker to be smoothly inserted into the cabinet. Preferably, the cross section of the locking protruding stand 41 extending out of the limiting hole 61 is a right-angled trapezoid or a right-angled triangle, the locking protruding stand 41 includes a straight surface perpendicular to the side wall of the limiting hole 61, and an inclined surface, the straight surface faces the direction for the circuit breaker to be pulled out of cabinets, the inclined surface faces the direction for the circuit breaker to be inserted into the cabinet, so that it is easy for the circuit breaker to insert into the cabinet in the opening state. The elastic member is the compression spring 10, of course, the elastic member may also be other elastic members such as a torsion spring or a leaf spring.

Further preferably, as shown in FIG. 2, when the button mechanism is in the opening position, after an external force is applied on the locking member 4, the locking protruding stand 41 of the locking member 4 retracts into the housing, then the locking member 4 abuts against the button mechanism to prevent the button mechanism from switching from the opening position to the closing position, so that the plug-in circuit breaker cannot be closed during installation to the cabinet, meanwhile the button 2 cannot press to the destinated position, avoiding energized operations. In the preferred embodiment shown in FIG. 3, the locking member 4 further includes the extending post 42, and the driving member 5 includes the driving limiting portion 51 fitting with the extending post 42. In this embodiment, the driving limiting portion 51 is a step arranged on the side wall of the driving member 5, and of course may also be a groove or a protrusion arranged on the driving member 5. When the button mechanism is in the opening position, the driving limiting portion 51 of the driving member 5 rotates to the position corresponding to the extending post 42 of the locking member 4. When the plug-in circuit breaker is inserted but not installed to the operating position, the limiting hole 61 of the plug-in circuit breaker is misaligned with the cabinet limiting hole B0, thus the locking protruding stand 41 of the locking member 4 retracts into the housing under the action of the external extrusion force applied by the cabinet sheet metal part. The extending post 42 of the locking member 4 extends into the driving limiting portion 51 and is in limit fit with the driving limiting portion 51 to hinder the driving member 5 from rotating in the closing direction, preventing the button mechanism from switching from the opening position to the closing position, so that the plug-in circuit breaker cannot be closed during installation to the installing position of cabinets, avoiding energized operations. In this embodiment, the locking member 4 abuts against the driving member 5, preventing the button mechanism from switching from the opening position to the closing position, with more reasonable layout structure and small occupied space. Of course, the locking member 4 may also abut against the button 2 or the connecting rod 7, for example, by limiting the button 2 with the protrusion or slot on the button 2, the button 2 cannot press toward the inside of the circuit breaker to closing, and the connecting rod 7 cannot move toward the closing position by abutting against the hook extending on the connecting rod 7.

Further preferably, as shown in FIG. 5, when the button mechanism is in the closing position, the locking protruding stand 41 of the locking member 4 extends out of the limiting hole 61 of the housing 6 and is limited by the button mechanism at the extension position, so it cannot retract into the housing, furthermore it is used for assisting the linkage member 3, preventing the circuit breaker from being inserted into the cabinet and pulled out from the cabinet in the closing state (the locking member 4 plays an auxiliary role; as there is a certain angle of inclination between the inclined surface 412 of the locking protruding stand 41 of the locking member and the outer surface of the circuit breaker, even if the locking protruding stand 41 is always exposed outside, it is still possible to forcibly push it into the circuit breaker in the closing state, with some elasticity in the structure of the cabinet sheet metal part, thereby causing potential safety hazards). In a preferred embodiment, the driving member 5 has the outer side surface 52; when the button mechanism is in the closing position, the locking protruding stand 41 of the locking member 4 extends out of the housing 6, and the driving limiting portion 51 of the driving member 5 rotates off to be misaligned with the extending post 42, so that the outer side surface 52 of the driving member 5 rotates to the position abutting against the extending post 42 of the locking member 4, so that the locking member 4 cannot retracts into the housing 6. When the button mechanism is in the opening position, the outer side surface 52 of the driving member 5 is misaligned with the locking member 4 to release the abutting fit, and at this time, the driving limiting portion 51 of the driving member 5 rotates to the position corresponding to the extending post 42.

Figure 3:
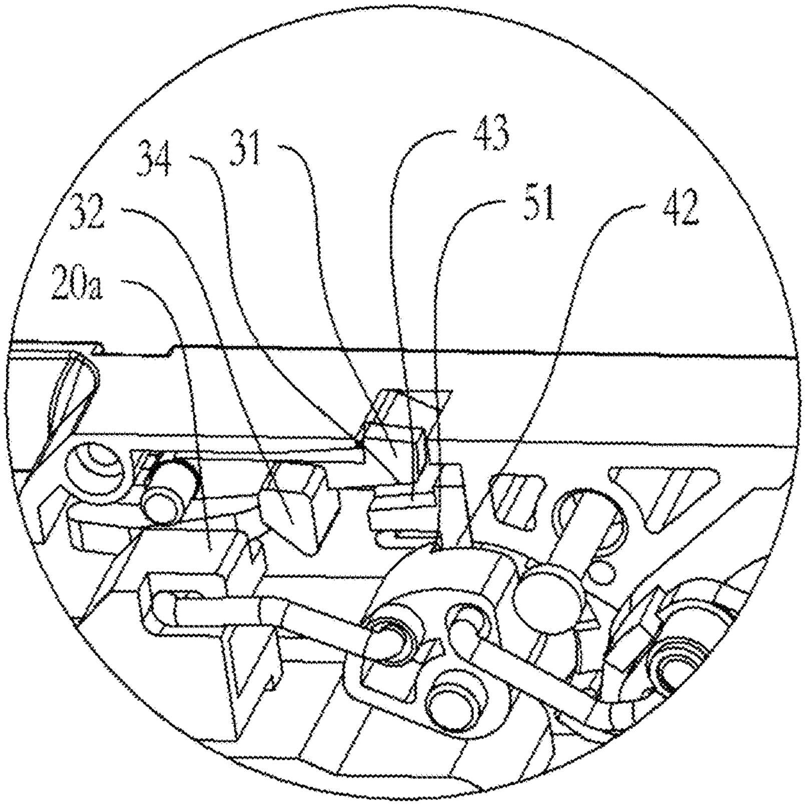
FIG. 3 is a partial enlarged view of the linkage member, the handle and the locking member of the present invention.

Further preferably, after the circuit breaker is opened, the button mechanism can be pulled out to move toward the outside of the housing 6, during such movement, the button mechanism enables the locking protruding stand 41 of the locking member 4 to return into the housing 6. Preferably, during moving toward the outside of the housing 6, the button mechanism actuates the linkage member 3, then the linkage member 3 drives the locking member 4 to unlock, so that the locking protruding stand 41 retracts into the housing 6. As shown in FIG. 3, in a preferred embodiment of the locking member 4, the locking member 4 is installed inside the housing 6 by means of a linear sliding pair, the direction of the linear movement thereof is perpendicular to the installation-insertion direction of the circuit breaker, and the locking member 4 is arranged between the button mechanism and the limiting hole 61. The upper portion of the locking member 4 close to the limiting hole 61 is provided with the locking protruding stand 41, and the lower portion of the locking member 4 close to the button mechanism is provided with the extending post 42. The linkage step 43 fitting with the linkage member 3 is arranged on one side of the locking protruding 41, and the elastic member is arranged between the lower portion of the locking member 4 and the housing 6, enabling the locking protruding stand 41 of the locking member 4 to extend out of the limiting hole 61. After the circuit breaker is opened, while the button mechanism moves toward the outside of the housing 6, the button mechanism actuates the linkage member 3, thus the linkage member 3 acts on the linkage step 43, and the locking member 4 enables the locking protruding stand 41 to retract into the housing 6 against the elastic force of the elastic member. Obviously, this technical solution has the beneficial effects as follows:

1. As the locking member 4 moves linearly in the direction perpendicular to the installation-insertion direction A, it can effectively prevent or reduce the stress deformation and/or micro displacement of the locking member 4 and the sheet metal part with the receiver inserted thereinto.
2. When the driving member 5 is in the closing position, the direction of the force applied on the locking member 4 from the outer side surface 52 is substantially parallel to the direction of the linear movement of the locking member 4, so it is difficult for a person depending on a reckless plug-out force to actuate the locking member 4 to return to the retraction position.
3. As the sliding groove and the sliding block pair can provide a great restraining force in the direction perpendicular to their horizontal movement, the extending post 42 and the driving limiting portion 51 fit with each other to enable themselves to provide a great restraining force against closing for the driving member 5, thereby effectively ensuring that no accidental closing occurs in the circuit breaker during plug-in and plug-out operations.

As shown in FIGS. 1 and 6, in a preferred embodiment of the linkage member 3, the linkage member 3 is rotatably arranged on the housing 6, and positioned between the button mechanism 2 and the limiting hole 61, and the linkage member 3 includes the abutting protruding stand 31 and the activated protruding stand 32. During the closing process, the button mechanism enables the abutting protruding stand 31 to extend out of the limiting hole 61 by pushing the activated protruding stand 32, and the button mechanism abuts against and fits with the activated protruding stand 32 so that the abutting protruding stand 31 cannot retract into the housing 6. During the opening process, the button mechanism releases the abutting fit with the activated protruding stand 32 and is displaced, thus the abutting protruding stand 31 retracts into the housing. The button mechanism includes the button 2, the connecting rod 7, and the driving member 5, the button 2 actuates the driving member 5 to act by means of the connecting rod 7, the driving member 5 is rotatably arranged in the housing 6 and connected to the operating mechanism 9. The button 2 is provided with the first driving portion 20 fitting with the activated protruding stand 32. Pressing the button 2 actuates the operating mechanism to perform the closing operation by the connecting rod 7 and the driving member 5. The first driving portion 20 on the button 2 actuates the linkage member 3 to rotate counterclockwise by the activated protruding stand 32, so that the abutting protruding stand 31 extends out of the limiting hole 61. When the button mechanism is in the closing position, the button 2 and the activated protruding stand 32 abut against the longitudinal surface 20*a* of the first driving portion 20 (it refers to the face set in the installation-insertion direction A), so that the abutting protruding stand 31 cannot retract into the housing 6, preventing plug-in and plug-out operations of the circuit breaker in the closing state, and avoiding energized operations. Pulling the button 2 actuates the operating mechanism to perform the pending operation by the connecting rod 7 and the driving member 5, when the button mechanism is in the opening position, the first driving portion 20 of the button 2 is dislocated and displaced with the activated protruding stand 32, so that the abutting protruding stand 31 retracts into the housing. When the button mechanism is in the opening position, the linkage member 3 may be actuated to rotate clockwise by the button mechanism to retract the abutting protruding stand 31 into the housing, of course, the spring may also be configured to rotate it clockwise, or the gravity of one end of the abutting protruding stand 31 may be depended to rotate it clockwise.

Preferably, the linkage member 3 further includes the unlocking portion 34 fitting with the locking member 4 and the linkage driving portion 33 fitting with the button mechanism. After the circuit breaker is opened, during moving toward the outside of the housing 6, the button mechanism actuates the linkage member 3 to rotate by means of the linkage driving portion 33, and the unlocking portion 34 applies a force on the locking member 4 to retract the locking protruding stand 41 of the locking member 4 into the housing 6. Specifically, in the preferred embodiment of the linkage member 3, the linkage member 3 has the middle provided with a rotating center, one end provided with the abutting protruding stand 31 at one side close to the limiting hole 61 and provided with the unlocking portion 34 fitting with the locking member 4 at the other side, and the other end provided with the linkage driving portion 33 bending toward the button mechanism, and activated protruding stand 32 is arranged at one side, close to the button mechanism, between the rotating center and the abutting protruding stand 31. The button mechanism is provided with the driving portion fitting with the linkage driving portion 33. During the opening process, the button mechanism releases the abutting fit with the activated protruding stand 32 and is displaced while moving toward the outside of the housing 6, and the driving portion on the button mechanism pulls the linkage driving portion 33 to actuate the linkage member 3 to rotate, so that the abutting protruding stand 31 retracts into the housing. When the button mechanism is in the opening position, the button mechanism can be pulled to move toward the outside of the housing 6, and the driving portion continues to drive the linkage member 3 to rotate while the button mechanism continues to move toward the outside of the housing 6, so that the unlocking portion 34 applies an external retracting force on the locking member 4, thus the locking member 4 returns to the housing 6.

In an embodiment, when the button mechanism is in the opening position, pulling the button 2 actuates the linkage member 3 to continue to rotate clockwise by means of the linkage member driving portion 33, so that the unlocking portion 34 presses the linkage step 43 of the locking member 4, enabling the locking protruding stand 41 of the locking member 4 to retract into the housing 6, and making the circuit breaker capable of being smoothly pulled out of the cabinet by pulling the button 2 after circuit breaker is opened. In another embodiment, By using the protruding stand on the button 2 as the driving portion, the bending portion is pulled to enable the abutting protruding stand 31 of the linkage member 3 to retract into the housing during circuit breaker opening. In yet another embodiment, a resetting spring can also be used to enable the abutting protruding stand 31 of the linkage member 3 to rotate in the direction away from the limiting hole 61, during circuit breaker opening the button mechanism releases the abutting fit with the activated protruding stand 32 and is displaced, then the resetting spring enables the abutting protruding stand 31 of the linkage member 3 to retract into the housing.

In a preferred embodiment, the button 2 of the button mechanism includes the button member 21 and the indicating member 22, thus the indicating member 22 fits with the linkage member 3, while achieving an indication of opening and closing, and the locking protruding stand 41 of the locking member 4 can be actuated to retract into the housing 6 after circuit breaker is opened. The indicating member 22 includes the rotating shaft 221, the display end surface 223, and the driving protruding stand 222 arranged on the rotating shaft 221. The driving portion fits with the linkage member driving portion 33 of the linkage member 3 by means of the driving protruding stand 222, and the display end surface 223 is provided with an indicating portion used as a opening and closing indicator. The indicating portion is provided with a corresponding color block or text serving as a opening and closing indicator, the cavitated installing hole 211 is arranged inside the button member 21, and the operation end face of the button member 21 is provided with the observation window 212 communicating with the installing hole 211. The indicating member 22 is installed inside the installing hole 211 of the button member 21 by means of the rotating shaft 22 and swings around the shaft. Such swinging action drives the indicating portion on the display end surface 223 to move under the observation window 212, the corresponding closing and opening state are indicated by moving the indicating portion into the observation window 212. When the circuit breaker is closed, the button 2 moves toward inside of the housing 6, and the driving protruding stand 222 fits with the bending end 32, enabling the indicating member 22 to rotate, so that the region of the indicating portion on the display end surface 223 corresponding to the closing state faces the observation window 212. When the circuit breaker is opened, the button 2 moves toward the outside of the housing 6, and the driving protruding stand 222 of the indicating member 22 fits with the linkage driving portion 33, thus the indicating member 22 rotates such that the region of the indicating portion on the display end surface 223 corresponding to the opening state faces the observation window 212 corresponding to the opening state. Meanwhile, the linkage member 3 actuates the linkage member driving portion 33 to rotate, so that the driving protruding stand 222 enables the abutting protruding stand 31 to retract into the housing, and at this time, the unlocking portion 34 of the linkage member 3 has not yet actuated the locking member 4 to retract into the housing 6 (the unlocking portion 34 is just in contact with the linkage step 43 of the locking member 4, or leaves a gap). After the circuit breaker is opened, the button 2 continues to be pulled, while the button 2 moves toward the outside of the housing 6, the driving protruding stand 222 drives the linkage 3 to rotate by the linkage member driving portion 33, thus the unlocking portion 34 applies a force on the locking member 4 to retract the locking member 4 into the housing 6.

In this embodiment, when the circuit breaker is closed, the first driving portion 20 of the button 2 fits with the activated protruding stand 32 of the linkage member, so as to actuate the abutting protruding stand 31 of the linkage member to extend out of the housing 6. In another embodiment, the indicating member 22 may be also used to actuate the abutting protruding 31 of the linkage member 3 to extend out of the housing 6, that is, the button 2 moves toward the inside of the housing 6 to actuate the circuit breaker to closing (see FIG. 9), while the driving protruding stand 222 of the indicating member 22 fits with the linkage member driving portion 33 of the linkage member 3, the indicating member 22 rotates such that the region of the indicating portion on the display end surface 223 corresponding to the closing state faces the observation window 212 corresponding to the closing state. Meanwhile, the linkage member 3 rotates, so that the abutting protruding member 31 of the linkage member 3 extends out of the housing 6.

Figure 7:
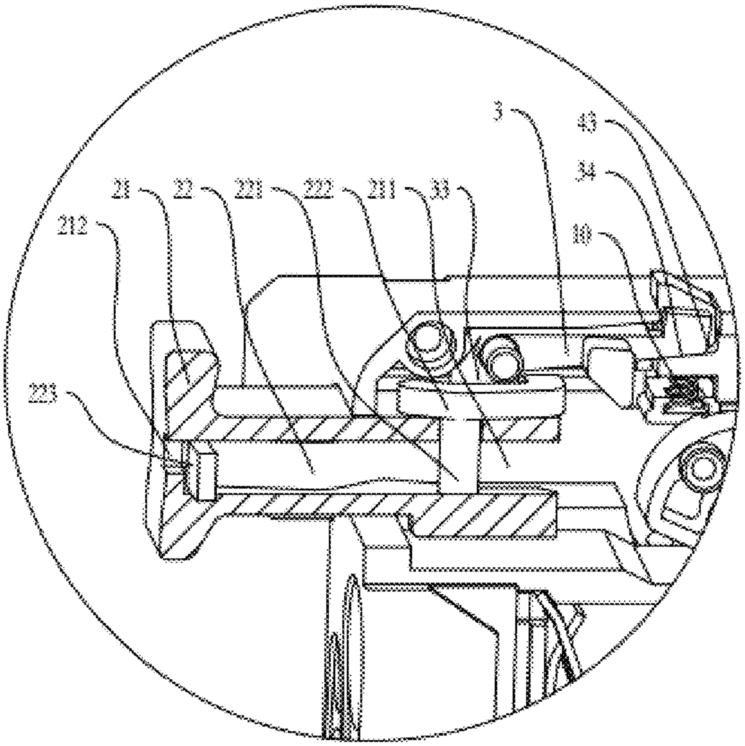
FIG. 7 is a partial enlarged view of the closing and opening indicating member and unlocking mechanism of the button mechanism.
Figure 8:
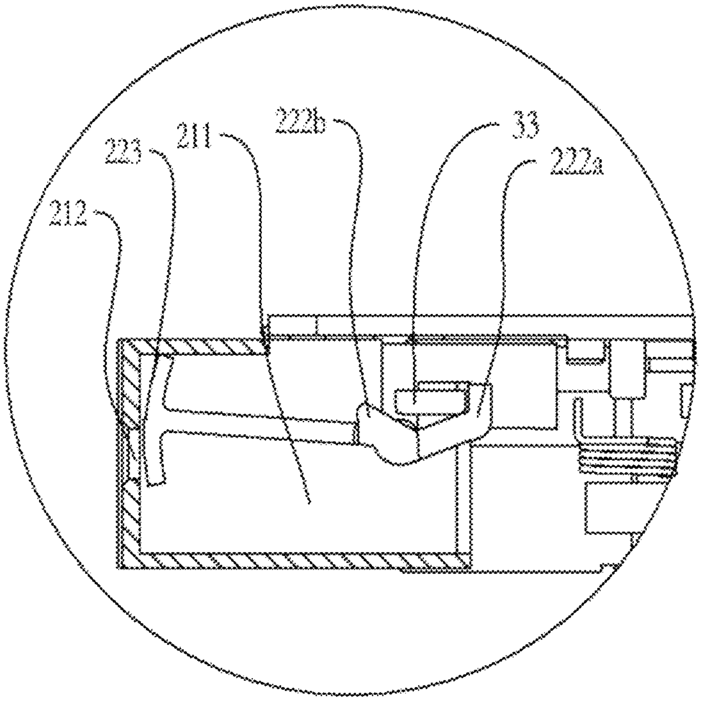
FIG. 8 is a partial enlarged view of the closing and opening indicating member and unlocking mechanism in the opening state.
Figure 9:
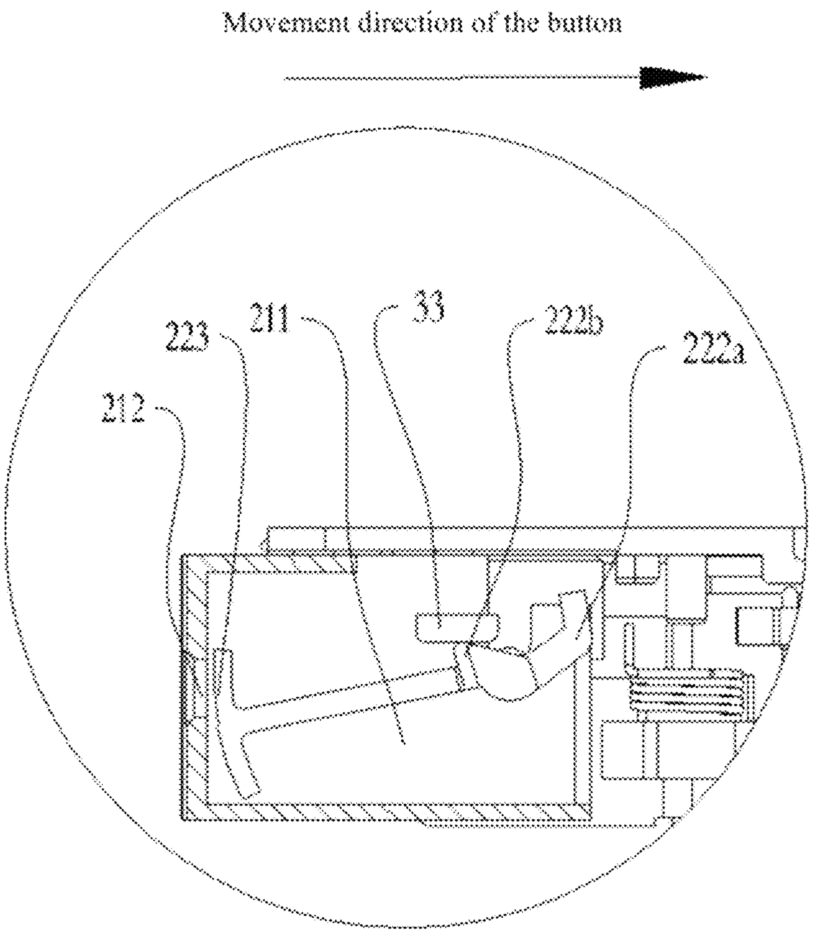
FIG. 9 is a partial enlarged view of the closing and opening indicating member and unlocking mechanism in the closing state.
Figure 10:
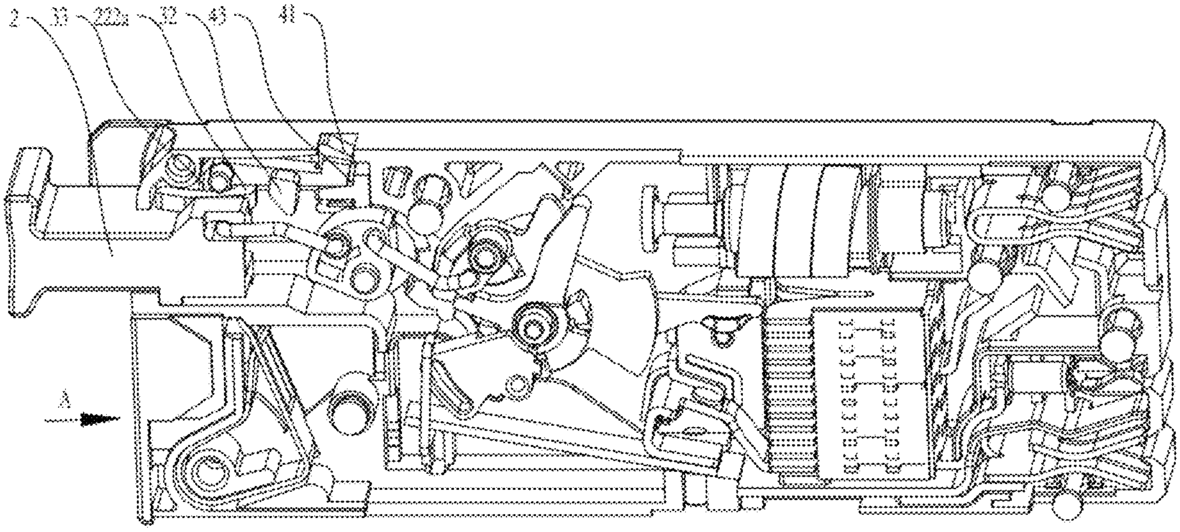
FIG. 10 is an overall structure view of the closing and opening indicating member and unlocking mechanism in the opening and disconnection state.

Specifically, as shown in FIGS. 7-9, the driving protruding stand 222 is arranged on one side of the rotating shaft 221, and the driving protruding stand 222 extends out of the button 2 to fit with the linkage member driving portion 33, of course, the linkage member driving portion 33 may reversely bend and extend into the button 2 to fit with the driving protruding stand 222, in addition, the driving protruding stand 222 may not be arranged on the rotating shaft 221, instead on one side of the connecting rod between the rotating shaft 221 and the display end surface 223.

Preferably, the left activated and **222*b* and the right activated end 222*a* are arranged on the driving protruding stand 222 of the indicating member 22 at intervals, and one side of the linkage member driving portion 33 of the linkage member 3 bending toward the button 2 is positioned between the left activated end 222*b* and the right activated end 222*a*, when the button 2 presses toward the interior of the circuit breaker to closing, the inclined surface of the left activated end 222*b* rotates counterclockwise under the resistance of the linkage member driving portion 33, and at this time, the closing identifier corresponding to the color of the indicating portion on the display end surface 223 can be displayed on the observation window 212. This technical solution is simple in structure, and can be combined with to simplify the unlocking structure. When the button 2 is pulled to perform the pending operation, the right activated end 222*a* of the indicating member acts on the right side surface of the linkage member driving portion 33 of the linkage member 3, under such action the linkage member 3 rotates clockwise, so that the abutting protruding stand 31 of the linkage member 3 retracts into the housing. Thus, while the indicating member 22 rotates clockwise, the opening identifier corresponding to the color of the indicating portion on the display end surface 223 can be displayed on the observation window 212. At this time, the unlocking portion 34 of the linkage member 3 is just in contact with the locking member 4 or leaves a gap, and the locking protruding stand 41 of the locking member 4 remains extending out of the housing 6**.

As shown in FIG. 8, in the opening state, when the circuit breaker needs to be detached from the installed cabinet, the button mechanism continues to be pulled in the direction away from the circuit breaker, the right activated end **222*a* of the indicating member acts on the right side surface of the linkage member driving portion 33 of the linkage 3, under such action the linkage member 3 rotates clockwise around the shaft. The unlocking portion 34 acts on the linkage portion 43 of the locking member 4, and the locking protruding stand 41 slidably retracts into the circuit breaker against the propulsive force of the spring 10, thus the locking protruding stand 41 releases the lock with the cabinet, and the circuit breaker can be detached from the operating position. The present invention has the following beneficial effects. First, direct linkage between indication displays and plug-in and plug-out safety protection forms a direct and fixed correspondence between the opening/closing displays and the extension/retraction position of the locking protruding stand 41 and the abutting protruding stand 31, so that operators can intuitively know well the current safety state of the circuit breaker. Second, it is possible to extend/retract the abutting protruding stand 31 and the locking protruding stand 41 on the locking member 4 from the identical common limiting hole 61**, so as to enable the reduction in the manufacturing difficulty of inserted receivers, facilitating the exchangeable and interchangeable use between circuit breaker products and inserted receivers, therefore reducing the costs of users. Thirdly, it simplifies the structure, cuts down the number of parts, and provides effective support for the miniaturization and low-cost manufacturing of circuit breaker products.

Preferably, the abutting protruding stand 31 is a square protruding stand, the side surfaces of the two sides of which are perpendicular to the installation-insertion direction of the circuit breaker, and are the left contour surface **31*a* and the right contour surface 31*b*, respectively, when the abutting protruding stand 31 is in the extension position, the left contour surface 31*a* and the right contour surface 31*b* are respectively perpendicular to the side wall of the limiting hole 61, that is, perpendicular to the installation insertion direction of the circuit breaker. The left contour surface 31*a* prevents the circuit breaker from being pulled out of the cabinet in the direction the circuit breaker is pulled out of the cabinet, and the right contour surface 31*b* prevents the circuit breaker from being inserted into the cabinet in the direction the circuit breaker is inserted into the cabinet, wherein the right contour surface 31*b* abuts against the transverse end face B1 of the cabinet sheet metal part with the receiver inserted thereinto to prevent insertion of the circuit breaker, and the left contour surface 31*a* abuts against the hole wall surface B2 of the limiting hole B0 of the cabinet sheet metal part with the receiver inserted thereinto. Such configuration has the beneficial effects that: effective reduction in the stress deformation of the inserted receiver, effective relaxation to the adaptation tolerance of the inserted receiver, effective and convenient usage and reduction in use costs. Preferably, one side of the activated protruding stand 32 close to the button 2** is an inclined surface.

Specifically, in a preferred embodiment of the plug-in circuit breaker of the present invention as shown in FIG. 1, the button mechanism includes the button 2, the connecting rod 7 and the driving member 5. The button 2 actuates the driving member 5 to rotate by the connecting rod 7, which actuates the operating mechanism 9 to perform the closing/opening operation by the connecting rod 8. The button mechanism and the driving member 5 respectively have the closing position/opening position corresponding to the closing state/opening state of the circuit breaker. That is, in the closing state, the button mechanism and the driving member

5 respectively have a determined position (closing position), and in the opening state, the button mechanism and the driving member 5 also respectively have a determined position (opening position); and the closing position/opening position corresponds to the closing state/opening state of the movable contact 9*a* and the stationary contact 9*b*.

The limiting hole 61 is arranged on the housing 6, the locking member 4 is slidably arranged at the position corresponding to the driving member 5 and positioned between the driving member 5 and the limiting hole 61, the linkage member 3 is rotatably arranged between the button 2 and the limiting hole 61, the linkage member 3 is arranged on the left side of the locking member 4 and positioned above the button mechanism.

The present invention has a beneficial feature in that when the button mechanism is in the closing position, the linkage member 3 is limited in the extension position by the button mechanism and cannot retract into the retraction position. The structure has the beneficial effects in that reliable prevention from plug-in and plug-out operations in the closing state, that is, preventing the circuit breaker from being forcibly inserted and pulled out in the closing state; and effective capability to enhance for circuit breaker products against non-normal forcible plug-in and plug-out operations with the characteristic of the incapability provided by this structure to retract in to the retraction position. When the button mechanism is in the opening position, there may be a plurality of technical solutions in the position where the linkage member 3 is positioned. In an optional solution, the linkage member 3 is not limited by the button mechanism and can be converted between the extension position and the retraction position, so it has its advantage in a simple structure. In another optional solution, namely the preferred solution of the present invention, the linkage member 3 is limited by the button mechanism and is in the retraction position when the button mechanism is in the opening position, so it has its advantage in direct avoidance of the resistance of the linkage member 3 to normal plug-in and plug-out operations of the circuit breaker. The present invention has another advantage in that the linkage member 3 acts as an unlocking member, so as to simplify the structure of the unlocking mechanism, and cut down the number of parts, and can enable the linkage member 3 and the driving locking member 4 to retract at the same time, so that the linkage member 3 and the driving locking member 4 do not generate any resistance to normal plug-in and plug-out operations of the circuit breaker.

The present invention has another beneficial feature in that the locking protruding stand 41 of the locking member 4 extends out of the housing 6 when the circuit breaker is in the opening state, but under an external force for retraction it can retract into the housing 6 by the force (only with a horizontal force, the locking member 4 will not retract, and it is necessary for a vertical component force to exist in the retraction direction), that is, the circuit breaker is not prevented from being inserted into the cabinet in the opening state, and the circuit breaker can be protected from falling out of the cabinet with vibration during a transportation process. The present invention has yet another beneficial feature in that when the button mechanism is in the opening position, when the locking protruding stand 41 of the locking member 4 retracts into the housing, then the locking member 4 resists against the driving member 5, so that the driving member 5 cannot rotate, preventing the button mechanism from switching from the opening position to the closing position, thus the circuit breaker cannot be closed. The present invention has yet another beneficial feature in that when the button mechanism is in the closing position, the locking member is limited in the extension position and cannot retract to the retraction position, and as an auxiliary mechanism together with the linkage member acts as a reliable hindrance to prevent the circuit breaker from being forcibly pulled out under the closing state. This structure characterized by its incapability to retract to the retraction position, effectively enhances the capability of circuit breaker products to resist the non-normal reckless plug-out operation.

The locking member 4 of the present invention has the beneficial effects as follows:

1. As the locking member 4 moves linearly in the direction perpendicular to the installation-insertion direction A, it can effectively prevent or reduce the stress deformation and/or micro displacement of the locking member 4 and the sheet metal part with the receiver inserted thereinto.
2. When the driving member 5 is in the closing position, the direction of the force applied on the locking member 4 from the outer side surface 52 is substantially parallel to the direction of the linear movement of the locking member 4, so it is difficult for a person depending on a reckless plug-out force to actuate the locking member 4 to return to the retraction position.
3. As the sliding groove and the sliding block pair can provide a great restraining force in the direction perpendicular to their horizontal movement, the extending post 42 and the driving limiting portion 51 fit with each other to enable themselves to provide a great restraining force against closing for the driving member 5, thereby effectively ensuring that no accidental closing occurs in the circuit breaker during plug-in and plug-out operations.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A plug-in circuit breaker comprising a housing, an operating mechanism and a button mechanism, the button mechanism actuates said operating mechanism to perform the closing/opening operation, and has a closing position and an opening position corresponding to closing/opening states of the circuit breaker, wherein the circuit breaker further includes a locking member and a linkage member arranged inside said housing, said linkage member is provided with an abutting protruding stand, said locking member is provided with a locking protruding stand;

when said button mechanism is in the closing position, said abutting protruding stand of said linkage member extends out of said housing and is limited by said button mechanism at an extension position, so that it cannot retract into said housing;

when said button mechanism is in the opening position, said linkage member retracts into said housing, said locking protruding stand of said locking member extends out of said housing, and said locking protruding stand of said locking member can be pushed back into said housing under the action of an external force for retraction, wherein when said button mechanism is in the opening position, said locking protruding stand of said locking member retracts into said housing under the action of the external force for retraction, thus said locking member abuts and fits with said button mechanism to hinder said button mechanism from switching from the opening position to the closing position.

2. The plug-in circuit breaker according to claim 1, wherein when said button mechanism is in the closing position, said locking protruding stand of said locking member extends out of said housing and is limited by said button mechanism at the extension position, so that it cannot retract into said housing.

3. The plug-in circuit breaker according to claim 1, wherein after the circuit breaker is opened, said button mechanism can be pulled out to move toward the outside of said housing, during such movement, said button mechanism enables said locking protruding stand of said locking member to return into said housing.

4. The plug-in circuit breaker according to claim 3, wherein during the movement of the button mechanism toward the outside of said housing, said button mechanism actuates said linkage member, said linkage member drives said locking member to unlock, so that said locking protruding stand retracts into said housing.

5. The plug-in circuit breaker according to claim 4, wherein said linkage member is rotatably arranged on said housing, and includes an unlocking portion fitting with said locking member and a linkage driving portion fitting with said button mechanism, said button mechanism, during moving toward the outside of said housing, actuates said linkage member to rotate by means of said linkage driving portion, said unlocking portion applies a force on said locking member to retract said locking protruding stand of said locking member into said housing.

6. The plug-in circuit breaker according to claim 1, wherein said button mechanism includes a button, a connecting rod and a driving member, said button activates said driving member to act by means of said connecting rod, said driving member is rotatably arranged inside said housing and connected with said operating mechanism.

7. The plug-in circuit breaker according to claim 6, wherein when said button mechanism is in the closing position, said locking protruding stand of said locking member extends out of said housing, and the outer side surface of said driving member abuts and fits with said locking member, so that said locking member cannot retracts into said housing; when said button mechanism is in the opening position, the outer side surface of said driving member is misaligned with said locking member to release the abutting fit.

8. The plug-in circuit breaker according to claim 6, wherein said locking member further includes an extending post, said driving member further includes a driving limiting portion fitting with said extending post, when said button mechanism is in the opening position, said driving limiting portion of said driving member faces said extending post of said locking member, when said locking protruding stand of said locking member retracts into said housing, said extending post of said locking member is in limit fit with said driving limiting portion to hinder said driving member from rotating in the closing direction, preventing said button mechanism from switching from the opening position to the closing position.

9. The plug-in circuit breaker according to claim 1, wherein said locking member is installed inside said housing by means of an elastic member, said elastic member is installed between said locking member and said housing, said elastic member enables said locking protruding stand of said locking member to extend out of said housing.

10. The plug-in circuit breaker according to claim 9, wherein the cross section of said locking protruding stand of said locking member is a right-angled trapezoid or a right-angled triangle, said locking protruding stand includes a straight surface and an inclined surface, the straight surface faces the direction for the circuit breaker to be pulled out of the cabinet and is perpendicular to the installation-insertion direction of the circuit breaker, said inclined surface faces the direction for the circuit breaker to be inserted into the cabinet.

11. The plug-in circuit breaker according to claim 1, wherein said linkage member includes said abutting protruding stand and an activated protruding stand, during the closing process, said button mechanism enables said abutting protruding stand to extend out of said housing by pushing said activated protruding stand, and said button mechanism abuts against and fits with said activated protruding stand, so that said abutting protruding stand cannot retract into said housing, during the opening process, said button mechanism releases the abutting fit with said activated protruding stand and is displaced, so that said abutting protruding stand retracts into said housing.

12. The plug-in circuit breaker according to claim 1, wherein a limiting hole is arranged on said housing, the abutting protruding stand of said linkage member and said locking protruding stand of said locking member fit with the identical limiting hole.

13. The plug-in circuit breaker according to claim 11, wherein said button mechanism includes a button, a connecting rod, and a driving member, said button actuates said driving member to act by means of said connecting rod, said driving member is rotatably arranged in said housing and connected to said operating mechanism, said button is provided with a first driving portion fitting with said activated protruding stand, when said button mechanism is in the closing position, said button and said activated protruding stand abut against said first driving portion, when said button mechanism is in the opening position, said first driving portion of the button is dislocated and displaced with said activated protruding stand.

14. The plug-in circuit breaker according to claim 11, wherein said abutting protruding stand is a square protruding stand, and includes a left contour surface and a right contour surface, when said abutting protruding stand is in the extension position, said left contour surface and said right contour surface are respectively perpendicular to the installation insertion direction of the circuit breaker, said left contour surface prevents the circuit breaker from being pulled out of the cabinet in the direction the circuit breaker is pulled out of the cabinet, and said right contour surface prevents the circuit breaker from being inserted into the cabinet in the direction the circuit breaker is inserted into the cabinet.

15. The plug-in circuit breaker according to claim 1, wherein a limiting hole fitting with said locking protruding stand is arranged on said housing, said locking member is installed inside said housing by means of a linear sliding pair, the direction of the linear movement thereof is perpendicular to the installation-insertion direction of the circuit breaker, said locking member is arranged between said button mechanism and said limiting hole, the upper portion of said locking member close to said limiting hole is provided with said locking protruding stand, and the lower portion of said locking member close to said button mechanism is provided with an extending post, a linkage step fitting with said linkage member is arranged on one side of said locking protruding stand.

16. The plug-in circuit breaker according to claim 11, wherein said linkage member has the middle provided with a rotating center, one end provided with said abutting protruding stand at one side and provided with an unlocking portion fitting with said locking member at the other side, and the other end provided with a linkage driving portion, said activated protruding stand is arranged at one side, close to said button mechanism, between said rotating center and said abutting protruding stand, said button mechanism is provided with the driving portion fitting with said linkage driving portion, during the opening process, said button mechanism releases the abutting fit with said activated protruding stand and is displaced while moving toward the outside of said housing, and the driving portion on said button mechanism pulls said linkage driving portion to actuate said linkage member to rotate, so that said abutting protruding stand retracts into the housing; when said button mechanism is in the opening position, said button mechanism can be pulled to move toward the outside of said housing, and the driving portion continues to drive said linkage member to rotate while said button mechanism continues to move toward the outside of said housing, so that said unlocking portion applies an external retracting force on said locking member, thus said locking member returns to said housing.

* * * * *